United States Patent
Kwon

[11] Patent Number: 5,852,552
[45] Date of Patent: Dec. 22, 1998

[54] HIGH VOLTAGE GENERATOR WITH A LATCH-UP PREVENTION FUNCTION

[75] Inventor: Jung Tae Kwon, Kyoungki-do, Rep. of Korea

[73] Assignee: Hyundai Electronics Industries Co.Ltd, Kyoungki-do, Rep. of Korea

[21] Appl. No.: 866,236

[22] Filed: May 30, 1997

[30] Foreign Application Priority Data

Jun. 27, 1996 [KR] Rep. of Korea ................. 1996-24280

[51] Int. Cl.[6] ................................................. H02M 3/18
[52] U.S. Cl. ............................................. 363/60; 327/536
[58] Field of Search ............................... 363/60; 307/110; 327/536; 257/299

[56] References Cited

U.S. PATENT DOCUMENTS 5,038,325  8/1991  Douglas et al. .................... 365/189.06
5,267,201  11/1993  Foss et al. .......................... 365/189.09
5,672,992  9/1997  Nadd ....................................... 327/390
5,703,827  12/1997  Leung et al. ....................... 365/230.06

*Primary Examiner*—Shawn Riley
*Attorney, Agent, or Firm*—Gary M. Nath; Nath & Assciates

[57] ABSTRACT

A high voltage generator comprising a charge pumping circuit including a precharge circuit for generating a high voltage and a plurality of transfer transistors connected to the precharge circuit for transferring the high voltage. The charge pumping circuit further includes a voltage controller for varying the voltage to a well including the transfer transistors according to a relative variation between an external supply voltage and the high voltage. P-N junctions formed in the well can be prevented from being forwardly biased, so that a latch-up phenomenon cannot occur. Further, because the charge pumping operation is not influenced by the level of the high voltage, the charge pumping circuit can be prevented from being erroneously operated due to an instable transient characteristic, even in the case where the initial external supply voltage has a low value.

5 Claims, 5 Drawing Sheets

HIGH VOLTAGE GENERATOR WITH A LATCH-UP PREVENTION FUNCTION

BACKGROUND OF THE INVENTION

1. Field of the Invention

The present invention relates to a high voltage generator for generating a voltage higher than an external supply voltage, and more particularly to a high voltage generator for preventing a latch-up phenomenon which may occur between a semiconductor substrate and a well region due to a boosted (pumped) high voltage.

2. Description of the Prior Art

Generally, a high voltage generator comprises a charge pumping circuit which generates a voltage higher than an external supply voltage in response to a desired clock signal from an oscillator.

FIG. 1 is a schematic block diagram illustrating the a construction of a conventional high voltage generator. As shown in this drawing, the conventional high voltage generator comprises an internal voltage down circuit 100 for receiving an external supply a voltage Vcc, generating an internal supply voltage Vint lower than the external supply voltage Vcc and applying the generated internal supply voltage Vint to an internal power line of a semiconductor device, and a high voltage generation circuit 200 for receiving the external supply voltage Vcc and the internal supply voltage Vint from the internal voltage down circuit 100 and generating a voltage Vpp higher than the external supply voltage Vcc.

The high voltage generation circuit 200 includes a high voltage level detector 210 being operated in response to the internal supply voltage Vint from the internal voltage down circuit 100 to detect a level of the high voltage Vpp fed back thereto, an oscillator 220 being operated in response to the external supply voltage Vcc to generate clocks, and a charge pumping circuit 230 for performing a charge pumping operation synchronously with the clocks from the oscillator 220.

FIG. 3 is a detailed circuit diagram illustrating the construction of the charge pumping circuit 230 in FIG. 1. As shown in this drawing, the charge pumping circuit 230 includes a clamp circuit 231 having a plurality of NMOS transistors N1–N5 for precharging the initial external supply voltage Vcc to a predetermined level, a first precharge circuit 232 for performing a first precharge operation in response to a reference clock OSC and a first clock CLK1 from the oscillator 220, a second precharge circuit 233 for performing a second precharge operation in response to the reference clock OSC and a second clock CLK2 from the oscillator 220, a first pumping capacitor PC3 for charging with a voltage higher than that charged in the first precharge circuit 232 in response to the first clock CLK1 from the oscillator 220, a second pumping capacitor PC4 for charging with a voltage higher than that charged in the second precharge circuit 233 in response to the second clock CLK2 from the oscillator 220, transfer transistors P1 and P2 for finally transferring the pumped high voltage Vpp, and an NMOS transistor NG for providing a desired voltage to a high voltage output terminal until the pumped high voltage Vpp reaches a normal level by the charge pumping operation after the initial external supply voltage Vcc is applied.

The first precharge circuit 232 includes an inverter INV1 for inverting the reference clock OSC from the oscillator 220, a NOR gate NOR1 for performing a NOR operation with respect to an output signal from the inverter INV1 and the first clock CLK1 from the oscillator 220, and a pumping capacitor PC1 for charging with an output voltage from the NOR gate NOR1.

The second precharge circuit 233 includes a NOR gate NOR2 for performing a NOR operation with respect to the reference clock OSC and second clock CLK2 from the oscillator 220, and a pumping capacitor PC2 for charging with an output voltage from the NOR gate NOR2.

FIG. 2 is a graph illustrating the relations between the input and output voltages in FIG. 1.

In FIG. 2, the internal supply voltage Vint and the high voltage Vpp are constantly maintained when the external supply voltage Vcc exceeds the high voltage Vpp.

Similarly, in FIG. 2, the internal supply voltage Vint and the high voltage Vpp are constantly maintained when the external supply voltage Vcc exceeds the high voltage Vpp. However, if the external supply voltage Vcc further exceeds a threshold value, the internal supply voltage Vint and the high voltage Vpp are increased in proportion to the increase of the external supply voltage Vcc.

As seen from the graphs of FIG. 2, an interval (Vcc>Vpp) is present where the external supply voltage Vcc is higher than the high voltage Vpp. In such an interval, a P-N junction between a semiconductor substrate and a well region may be turned on, resulting in latch-up.

In order to prevent such a latch-up phenomenon, conventionally, a voltage lower than the high voltage Vpp is always applied to gate terminals of the transfer transistors P1 and P2 for the output of the high voltage Vpp, as shown in FIG. 3.

The operation of the charge pumping circuit 230 with the construction of FIG. 3 will hereinafter be described.

In the clamp circuit 231, the NMOS transistor N1 has its gate terminal for inputting the high voltage Vpp, its drain terminal for inputting the external supply voltage Vcc and its source terminal connected to a first node NODE1. With this construction, the NMOS transistor N1 functions to always maintain a voltage at the first node NODE1 at a level lower than the high voltage Vpp.

As a result, voltages at second and third nodes NODE2 and NODE3 are lower than the high voltage Vpp.

On the other hand, at the initial operation state, the high voltage Vpp does not reach the normal level. As a result, the high voltage Vpp has a level of Vcc–Vt provided by the NMOS transistor N6 until it reaches the normal level by the charge pumping operation.

The "Vt" indicates a threshold voltage of the NMOS transistor N6. Actually, the transistors have different threshold voltages due to the body effect. However, for a simple description of the circuit operation, it is assumed in the present invention that all of the NMOS transistors have the same threshold voltage.

The voltage at the first node NODE1 has a level of Vpp–Vth because the NMOS transistor N6 is initially turned on by the external supply voltage Vcc. As a result, because Vpp=Vcc–Vth, the voltage at the first node NODE1 has a level of Vcc–2Vth.

In the first precharge circuit 232, a voltage is charged in the pumping capacitor PC1 by logically combining the reference clock OSC and first clock CLK1 from the oscillator 220.

In the second precharge circuit 233, a voltage is charged in the pumping capacitor PC2 by logically combining the reference clock OSC and second clock CLK2 from the oscillator 220.

Preferably, the first and second precharge circuits 232 and 233 may be designed in a symmetrical manner.

The first precharge circuit 232 performs the first precharge operation when the reference clock OSC from the oscillator 220 is high in logic and the first clock CLK1 from the oscillator 220 is low in logic.

The second precharge circuit 233 performs the second precharge operation when the reference clock OSC and second clock CLK2 from the oscillator 220 are both low in logic.

As a result, if the first and second clocks CLK1 and CLK2 are both low in logic, the precharge operations are performed successively.

At this time, the voltages charged in the pumping capacitors PC1 and PC2 are about Vcc, and the voltages charged in the pumping capacitors PC3 and PC4 are somewhat higher than those charged in the pumping capacitors PC1 and PC2.

Under the above condition, the transfer transistors P1 and P2 are turned on to transfer the pumped voltage as the high voltage Vpp.

Noticeably, no problem is caused in the charge pumping operation in the case where the external supply voltage Vcc applied to the charge pumping circuit 230 has a sufficiently high value. However, in the case where the external supply voltage Vcc has a low value, the voltage at the first node NODE1 becomes very low, so that the charge pumping operation cannot be performed smoothly.

SUMMARY OF THE INVENTION

The present invention has been made in view of the above problem, and it is an object of the present invention to provide a high voltage generator in which a voltage to an N-well including transfer transistors in a charge pumping circuit is varied with a relative variation between a boosted high voltage and an external supply voltage, so that a charge pumping operation can stably be performed in the case where the external supply voltage has a low value and no latch-up phenomenon can occur in the case where the external supply voltage exceeds a threshold value.

In accordance with the present invention, the above and other objects can be accomplished by a provision of a high voltage generator comprising charge pumping means including precharge means for generating a high voltage and a plurality of transfer transistors connected to the precharge means for transferring the high voltage, wherein the charge pumping means further includes voltage control means for varying a voltage to a well including the transfer transistors according to a relative variation between an external supply voltage and the high voltage.

The high voltage is applied to the well when the high voltage is higher than the external supply voltage.

The external supply voltage is applied to the well when the external supply voltage is higher than the high voltage.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 4:
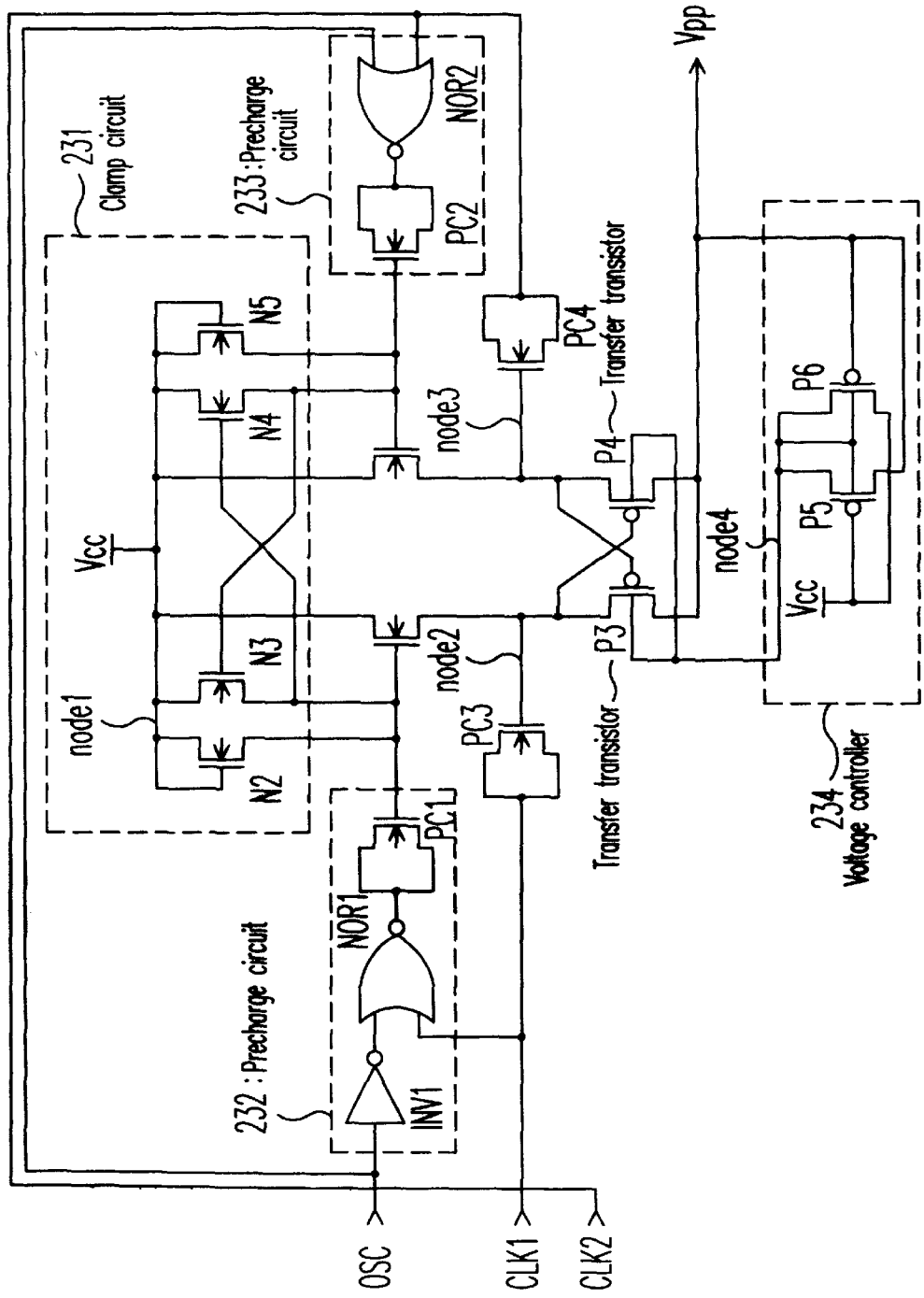
FIG. 4 is a detailed circuit diagram illustrating the construction of a charge pumping circuit in a high voltage generator in accordance with an embodiment of the present invention.

FIG. 4 is a detailed circuit diagram illustrating the construction of a charge pumping circuit in a high voltage generator in accordance with an embodiment of the present invention. As shown in this drawing, the charge pumping circuit comprises a clamp circuit 231 having a plurality of NMOS transistors N2–N5 for precharging an initial external supply voltage Vcc to a predetermined level, a first precharge circuit 232 for performing a first precharge operation in response to a reference clock OSC and a first clock CLK1 from the oscillator 220, a second precharge circuit 233 for performing a second precharge operation in response to the reference clock OSC and a second clock CLK2 from the oscillator 220, a first pumping capacitor PC3 for charging with a voltage higher than that charged in the first precharge circuit 232 in response to the first clock CLK1 from the oscillator 220, a second pumping capacitor PC4 for charging with a voltage higher than that charged in the second precharge circuit 233 in response to the second clock CLK2 from the oscillator 220, transfer transistors P3 and P4 for finally transferring a pumped high voltage Vpp, and a voltage controller 234 for varying a voltage to an N-well of the transfer transistors P3 and P4 according to a relative variation between the external supply voltage Vcc and the high voltage Vpp.

Figure 1:
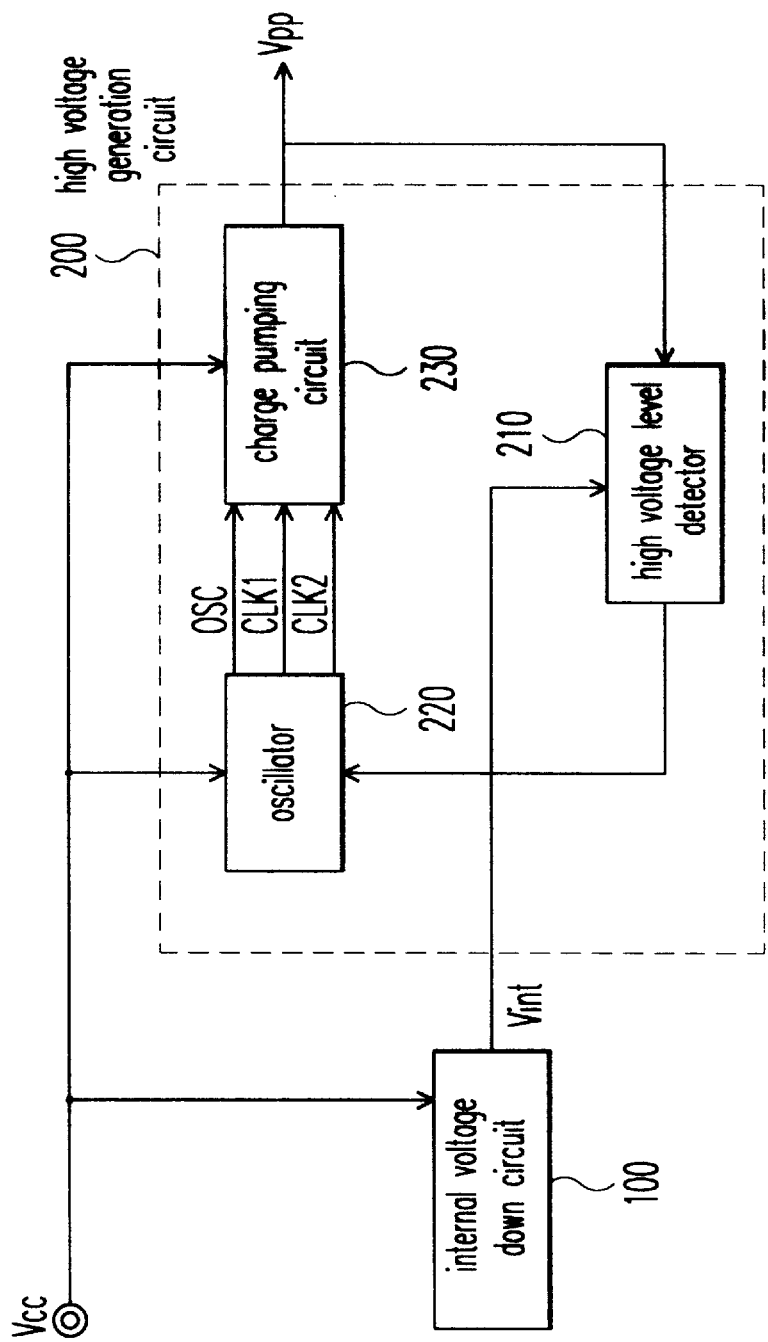
FIG. 1 is a schematic block diagram illustrating the construction of a conventional high voltage generator.
Figure 2:
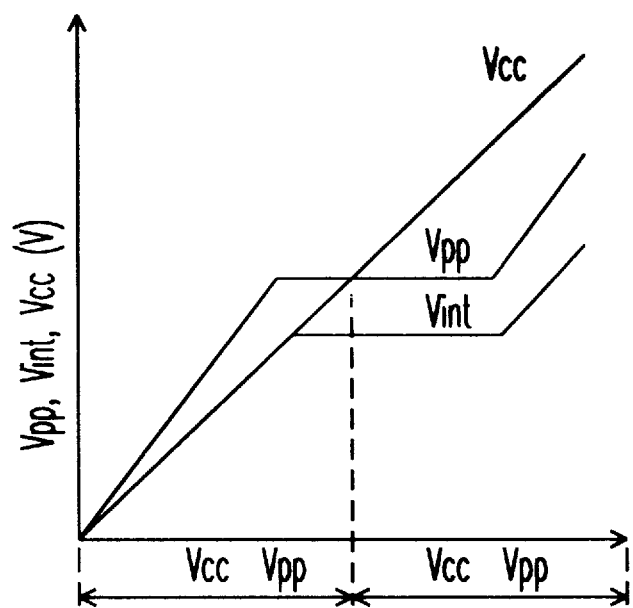
FIG. 2 is graph illustrating the relations between input and output voltages in FIG. 1.
Figure 3:
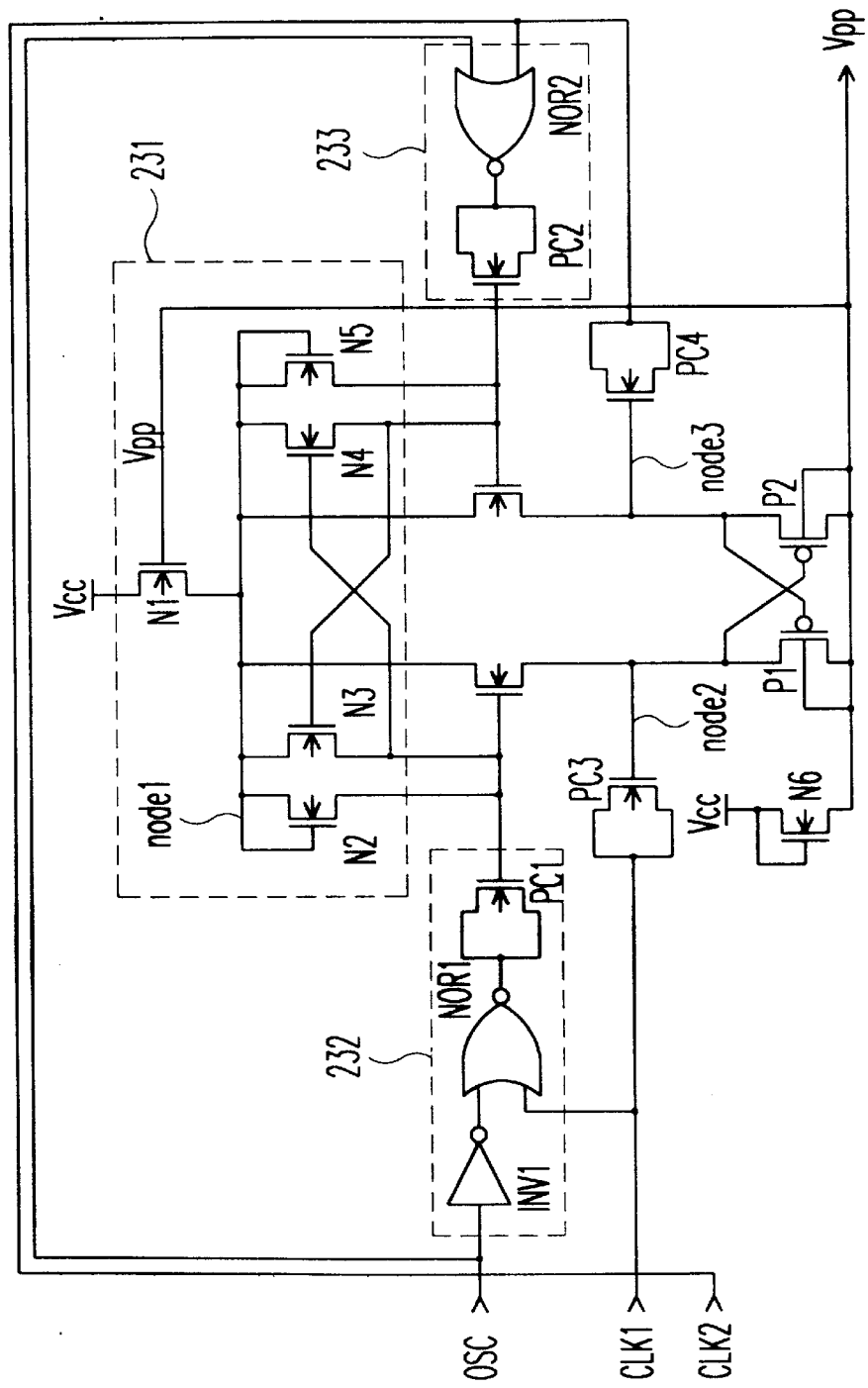
FIG. 3 is a detailed circuit diagram illustrating the construction of a charge pumping circuit in FIG. 1.

The first and second precharge circuits 232 and 233 are the same in construction and operation as those in FIG. 3 and a detailed description thereof will thus be omitted.

The voltage controller 234 includes a PMOS transistor P5 having its gate terminal for inputting the external supply voltage Vcc, its source terminal connected to a high voltage output terminal and its drain terminal connected to the N-well of the transfer transistors P3 and P4, and a PMOS transistor P6 having its gate terminal for inputting the high voltage Vpp, its source terminal connected to a terminal of the external supply voltage Vcc and its drain terminal connected to the N-well of the transfer transistors P3 and P4.

The PMOS transistors P5 and P6 function as transfer transistors.

The operation of the charge pumping circuit with the above-mentioned construction in accordance with the embodiment of the present invention will hereinafter be described.

For a simple description of the circuit operation, it is assumed in the present invention that all of the PMOS transistors have the same threshold voltage. Also, the same parts as those in FIG. 3 will be omitted in this description.

In an active interval where Vcc>Vpp−|Vt|, the PMOS transistor P6 is turned on because a gate-source voltage thereof is higher than |Vt|. However, the PMOS transistor P5 is turned off because a gate-source voltage thereof is lower than |Vt|.

As a result, the external supply voltage Vcc is applied through the turned-on PMOS transistor P6 to a fourth node NODE4, or the N-well of the PMOS transistors P3 and P4.

On the other hand, in an active interval where Vcc<Vpp+|Vt|, the PMOS transistor P5 is turned on because the gate-source voltage thereof is higher than |Vt|. However, the PMOS transistor P6 is turned off because the gate-source voltage thereof is lower than |Vt|.

As a result, the high voltage Vpp is applied through the turned-on PMOS transistor P5 to the fourth node NODE4, or the N-well of the PMOS transistors P3 and P4.

Further, in an active interval where Vpp−|Vt|<Vcc<Vpp+|Vt|, the PMOS transistors P5 and P6 are both turned off because the gate-source voltages thereof are both lower than |Vt|. As a result, the fourth node NODE4, or the N-well of the PMOS transistors P3 and P4, enters a floating state.

As mentioned above, the N-well voltage of the PMOS transistors P3 and P4 is varied into the external supply voltage Vcc, the high voltage Vpp or the floating state according to the relative difference between the external supply voltage Vcc and the high voltage Vpp. Therefore, a P-N junction formed in the N-well can be prevented from being forwardly biased over the entire active interval of the external supply voltage Vcc. Further, because the charge pumping operation is not influenced by the level of the high voltage Vpp, the charge pumping circuit can be prevented from being erroneously operated due to an instable transient characteristic, even in the case where the initial external supply voltage Vcc has a low value.

Figure 5:
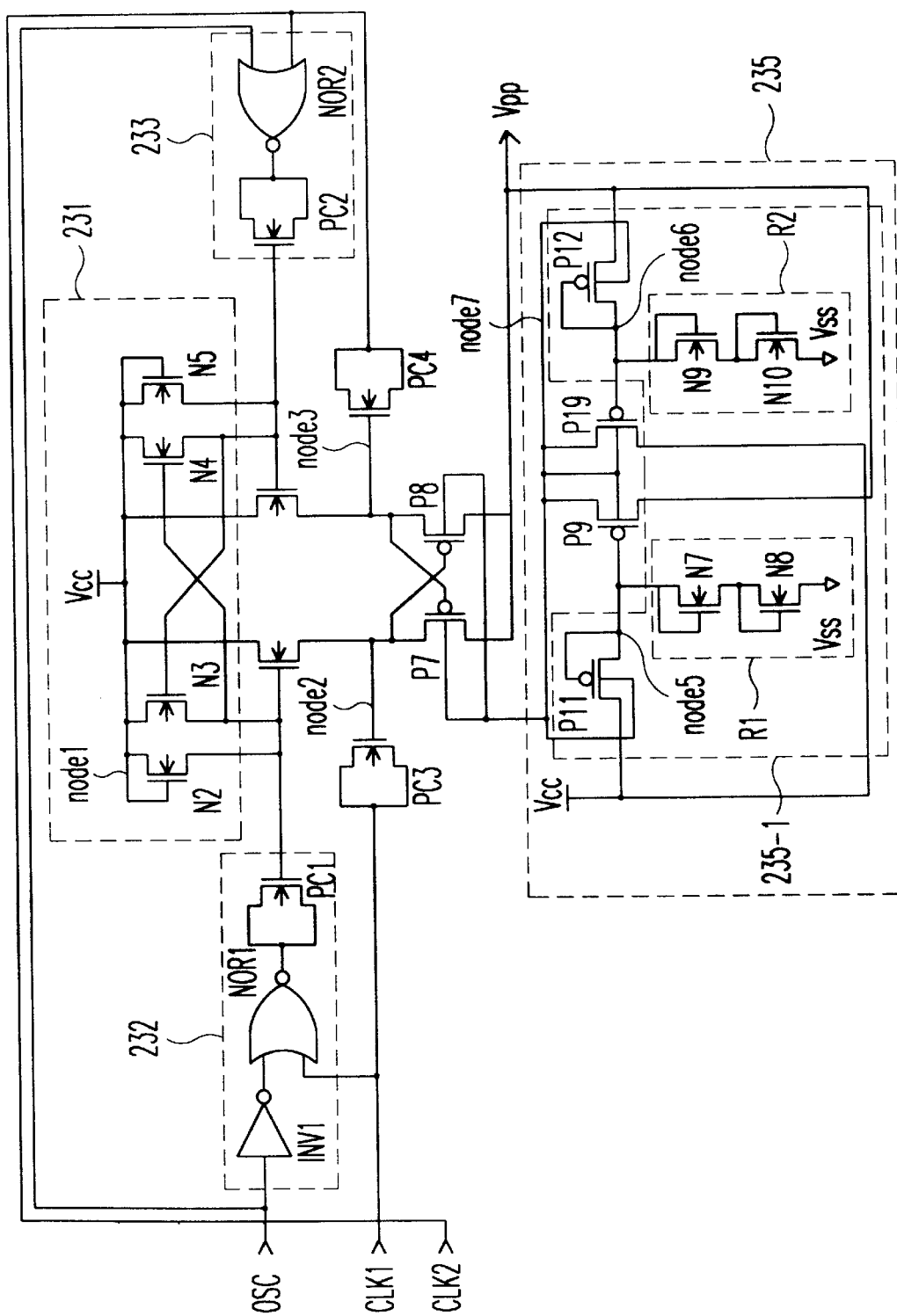
FIG. 5 is a detailed circuit diagram illustrating the construction of a charge pumping circuit in a high voltage generator in accordance with an alternative embodiment of the present invention.

FIG. 5 is a detailed circuit diagram illustrating the construction of a charge pumping circuit in a high voltage generator in accordance with an alternative embodiment of the present invention. The floating interval in the first embodiment is removed in the second embodiment.

As shown in FIG. 5, the charge pumping circuit comprises a clamp circuit 231 having a plurality of NMOS transistors N2–N5 for precharging an initial external supply voltage Vcc to a predetermined level, a first precharge circuit 232 for performing a first precharge operation in response to a reference clock OSC and a first clock CLK1 from the oscillator 220, a second precharge circuit 233 for performing a second precharge operation in response to the reference clock OSC and a second clock CLK2 from the oscillator 220, a first pumping capacitor PC3 for charging with a voltage higher than that charged in the first precharge circuit 232 in response to the first clock CLK1 from the oscillator 220, a second pumping capacitor PC4 for charging with a voltage higher than that charged in the second precharge circuit 233 in response to the second clock CLK2 from the oscillator 220, transfer transistors P7 and P8 for finally transferring a pumped high voltage Vpp, and a voltage controller 235 for varying a voltage to an N-well of the transfer transistors P7 and P8 according to a relative variation between the external supply voltage Vcc and the high voltage Vpp.

The first and second precharge circuits 232 and 233 are the same in construction and operation as those in FIG. 3 and a detailed description thereof will thus be omitted.

The voltage controller 235 includes a floating interval removing circuit 235-1. The floating interval removing circuit 235-1 includes a PMOS transistor P11 having its gate and drain terminals connected in common to a fifth node NODE5 and its source terminal connected to a terminal of the external supply voltage Vcc, a resistor part R1 having its one side connected to the fifth node NODE5 and its other side connected to a ground voltage terminal Vss, a PMOS transistor P12 having its gate and source terminals connected in common to a sixth node NODE6 and its drain terminal connected to a high voltage output terminal, and a resistor part R2 having its one side connected to the sixth node NODE6 and its other side connected to the ground voltage terminal Vss.

The voltage controller 235 further includes a PMOS transistor P9 having its gate terminal connected to the fifth node NODE5, its source terminal connected to the high voltage output terminal and its drain terminal connected to a seventh node NODE7, or the N-well of the PMOS transistors P7 and P8, and a PMOS transistor P10 having its gate terminal connected to the sixth node NODE6, its source terminal connected to the terminal of the external supply voltage Vcc and its drain terminal connected to the seventh node NODE7, or the N-well of the PMOS transistors P7 and P8.

The resistor part R1 is provided with a plurality of NMOS transistors N7 and N8 connected in series between the fifth node NODE5 and the ground voltage terminal Vss. The resistor part R2 is provided with a plurality of NMOS transistors N9 and N10 connected in series between the sixth node NODE6 and the ground voltage terminal Vss.

For the smooth supply of current, each of the NMOS transistors N7 and N8 may preferably have a much larger channel width than that of the PMOS transistor P11.

Similarly, each of the NMOS transistors N9 and N10 may preferably have a much larger channel width than that of the PMOS transistor P12.

The operation of the charge pumping circuit with the above-mentioned construction in accordance with the second embodiment of the present invention will hereinafter be described.

For a simple description of the circuit operation, it is assumed in the present invention that all of the POS and NMOS transistors have the same threshold voltage in view of the absolute value.

In operation, a voltage at the output node NODE5 of the PMOS transistor P11 which is applied with the external supply voltage Vcc has a level of Vcc−Vt. Also, a voltage at the output node NODE6 of the PMOS transistor P12 which is applied with the high voltage Vpp has a level of Vpp−Vt.

The PMOS transistors P9 and P10 which receive the voltages at the fifth and sixth nodes NODE5 and NODE6 respectively at their gate terminals function to switch the N-well voltage of the PMOS transistors P7 and P8 to the high voltage Vpp or the external supply voltage Vcc.

In an active interval where Vcc>Vpp, the PMOS transistor P10 is turned on because a gate-source voltage thereof is higher than |Vt|. However, the PMOS transistor P9 is turned off because a gate-source voltage thereof is lower than |Vt|.

As a result, the external supply voltage Vcc is applied to the N-well of the PMOS transistors P7 and P8 through the turned-on PMOS transistor P10.

On the other hand, in an active interval where Vcc<Vpp, the PMOS transistor P9 is turned on because the gate-source voltage thereof is higher than |Vt|. However, the PMOS transistor P10 is turned off because the gate-source voltage thereof is lower than |Vt|.

As a result, the high voltage Vpp is applied to the N-well of the PMOS transistors P7 and P8 through the turned-on PMOS transistor P9.

As mentioned above, the N-well of the PMOS transistors P7 and P8 is applied with the higher of the external supply voltage Vcc and high voltage Vpp over the entire active interval of the external supply voltage Vcc and high voltage Vpp, so that P-N junctions formed in the N-well can be prevented from being forwardly biased. Therefore, the latch-up phenomenon does not occur over the entire active interval of the external supply voltage Vcc. Further, because the charge pumping operation is not influenced by the level of the high voltage Vpp, the charge pumping circuit can be prevented from being erroneously operated due to an instable transient characteristic, even in the case where the initial external supply voltage Vcc has a low value.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high voltage generator comprising charge pumping means including precharge means for generating a high voltage, a plurality of transfer transistors connected to said precharge means for transferring said high voltage to an output node, and clamp means for supplying another voltage lower than the high voltage to the transistors to precharge the transistors;

wherein said charge pumping means further includes voltage control means for varying a voltage in a well including said transfer transistors according to a relative voltage variation between an external supply voltage and said high voltage to prevent a latch-up phenomenon between the output node and a bulk region of the transistors.

2. A high voltage generator comprising charge pumping means including precharge means for generating a high voltage and a plurality of transfer transistors connected to said precharge means for transferring said high voltage, wherein said charge pumping means further includes voltage control means for varying a voltage to a well including said transfer transistors according to a relative variation between an external supply voltage and said high voltage, wherein said voltage control means includes:

a first PMOS transistor having its gate terminal for inputting said external supply voltage, its source terminal connected to a high voltage output terminal and its drain terminal connected to said well including said transfer transistors, said first PMOS transistor applying said high voltage to said well when said high voltage is higher than said external supply voltage; and a second PMOS transistor having its gate terminal for inputting said high voltage, its source terminal connected to a terminal of said external supply voltage and its drain terminal connected to said well including said transfer transistors, said second PMOS transistor applying said external supply voltage to said well when said external supply voltage is higher than said high voltage.

3. A high voltage generator comprising charge pumping means including precharge means for generating a high voltage and a plurality of transfer transistors connected to said precharge means for transferring said high voltage, wherein said charge pumping means further includes voltage control means for varying a voltage to a well including said transfer transistors according to a relative variation between an external supply voltage and said high voltage, wherein said voltage control means includes:

floating interval removing means for preventing said well from being forwardly biased and preventing said transfer transistors from entering a floating state;

a first PMOS transistor having its gate terminal connected to said floating interval removing means, its source terminal connected to a high voltage output terminal and its drain terminal connected to said well including said transfer transistors, said first PMOS transistor applying said high voltage to said well when said high voltage is higher than said external supply voltage; and a second PMOS transistor having its gate terminal connected to said floating interval removing means, its source terminal connected to a terminal of said external supply voltage and its drain terminal connected to said well including said transfer transistors, said second PMOS transistor applying said external supply voltage to said well when said external supply voltage is higher than said high voltage.

4. A high voltage generator as set forth in claim 3, wherein said floating interval removing means includes:

a third PMOS transistor having its gate and drain terminals connected in common to said gate terminal of said first PMOS transistor and its source terminal connected to said external supply voltage terminal;

first resistor means having its one side connected in common to said gate and drain terminals of said third PMOS transistor and its other side connected to a ground voltage terminal;

a fourth PMOS transistor having its gate and source terminals connected in common to said gate terminal of said second PMOS transistor and its drain terminal connected to said high voltage output terminal; and second resistor means having its one side connected in common to said gate and source terminals of said fourth PMOS transistor and its other side connected to said ground voltage terminal.

5. A high voltage generator as set forth in claim 4, wherein each of said first and second resistor means includes a plurality of NMOS transistors, each of said NMOS transistors of said first resistor means having a larger channel width than that of said third PMOS transistor, each of said NMOS transistors of said second, resistor means having a larger channel width than that of said fourth PMOS transistor.

* * * * *